US009747802B2

(12) United States Patent
Fisher et al.

(10) Patent No.: US 9,747,802 B2
(45) Date of Patent: Aug. 29, 2017

(54) COLLISION AVOIDANCE SYSTEM AND METHOD FOR AN UNDERGROUND MINE ENVIRONMENT

(71) Applicant: INNOVATIVE WIRELESS TECHNOLOGIES, INC., Lynchburg, VA (US)

(72) Inventors: Matthew A. Fisher, Rustburg, VA (US); Paul R. Carpenter, Lynchburg, VA (US); James E. Silverstrim, Moneta, VA (US)

(73) Assignee: Innovative Wireless Technologies, Inc., Lynchburg, VA (US)

( * ) Notice: Subject to any disclaimer, the term of this patent is extended or adjusted under 35 U.S.C. 154(b) by 553 days.

(21) Appl. No.: 14/202,228

(22) Filed: Mar. 10, 2014

(65) Prior Publication Data

US 2015/0254985 A1   Sep. 10, 2015

(51) Int. Cl.
| | |
|---|---|
| *H04N 7/12* | (2006.01) |
| *G08G 1/16* | (2006.01) |
| *H04N 5/33* | (2006.01) |
| *G06K 9/00* | (2006.01) |
| *B60W 30/09* | (2012.01) |

(52) U.S. Cl.
CPC ............ *G08G 1/166* (2013.01); *B60W 30/09* (2013.01); *G06K 9/00362* (2013.01); *G06K 9/00805* (2013.01); *H04N 5/33* (2013.01)

(58) Field of Classification Search
None
See application file for complete search history.

(56) References Cited

U.S. PATENT DOCUMENTS

| | | | |
|---|---|---|---|
| 6,226,389 B1 | 5/2001 | Lemelson et al. | |
| 6,281,806 B1 * | 8/2001 | Smith | B60Q 1/085 340/436 |

(Continued)

FOREIGN PATENT DOCUMENTS

| | | |
|---|---|---|
| WO | 2005043930 A | 5/2005 |
| WO | 2009018212 A | 2/2009 |

(Continued)

*Primary Examiner* — Mehrdad Dastouri
*Assistant Examiner* — Samuel D Fereja
(74) *Attorney, Agent, or Firm* — New River Valley IP Law, PC; Michele L. Mayberry; Timothy D. Nolan

(57) ABSTRACT

Described are methods and systems for collision avoidance in an underground mine environment that use one or more of a computer vision component, an asset tracking system, and a motion detection component for the purpose of determining and responding to potential collision threats. Imaging is captured and processed in real time, so that assets of interest can be identified and used in evaluating potential for collision with other assets. Location data from an asset tracking system is likewise evaluated and used to determine proximity of assets in relation to the host. A final input is provided by the motion detection component that intelligently determines movement patterns and direction of travel. Once these components' inputs are collectively evaluated, a proximity or a threat value is generated which determine an audible or visual signal or action to prevent collision and increase safety in unfavorable conditions.

19 Claims, 8 Drawing Sheets

(56) References Cited

U.S. PATENT DOCUMENTS

| | | | |
|---|---|---|---|
| 6,526,352 B1* | 2/2003 | Johnson | G01C 21/3697 342/357.31 |
| 6,553,130 B1 | 4/2003 | Lemelson et al. | |
| 7,102,496 B1* | 9/2006 | Ernst, Jr. | G08G 1/164 180/167 |
| 7,119,676 B1 | 10/2006 | Silverstrim et al. | |
| 7,983,685 B2 | 7/2011 | Silverstrim et al. | |
| 8,244,260 B2 | 8/2012 | Silverstrim et al. | |
| 8,280,621 B2 | 10/2012 | Edwards et al. | |
| 8,385,322 B2 | 2/2013 | Colling et al. | |
| 8,527,172 B2 | 9/2013 | Moshchuk et al. | |
| 8,885,559 B2 | 11/2014 | Schmidt et al. | |
| 9,179,475 B2 | 11/2015 | Koleszar et al. | |
| 9,258,722 B2 | 2/2016 | Schmidt et al. | |
| 2004/0022416 A1 | 2/2004 | Lemelson et al. | |
| 2005/0004723 A1* | 1/2005 | Duggan | G05D 1/0061 701/24 |
| 2005/0100192 A1* | 5/2005 | Fujimura | G06K 9/00369 382/103 |
| 2007/0021915 A1* | 1/2007 | Breed | B60N 2/2863 701/301 |
| 2010/0208244 A1* | 8/2010 | Earhart | G01S 3/7867 356/139.01 |
| 2012/0008542 A1 | 1/2012 | Koleszar et al. | |
| 2012/0011365 A1 | 1/2012 | Schmidt et al. | |
| 2012/0025964 A1* | 2/2012 | Beggs | B60Q 1/2673 340/435 |
| 2012/0268262 A1* | 10/2012 | Popovic | B60Q 9/008 340/438 |
| 2013/0278440 A1 | 10/2013 | Rubin et al. | |
| 2015/0036482 A1 | 2/2015 | Schmidt et al. | |

FOREIGN PATENT DOCUMENTS

| | | |
|---|---|---|
| WO | 2010107440 A | 9/2010 |
| WO | 2010107441 A | 9/2010 |

* cited by examiner

COLLISION AVOIDANCE SYSTEM AND METHOD FOR AN UNDERGROUND MINE ENVIRONMENT

CROSS-REFERENCE TO RELATED APPLICATIONS

This application is related by subject matter to U.S. patent application Ser. Nos. 13/257,378 and 13/257,369, filed Sep. 19, 2011, which published as 2012/0008542 and 2012/0011365, respectively, on Jan. 12, 2012. Other related patents include U.S. Pat. Nos. 7,119,676; 7,983,685; 8,244,260; and 8,385,322; and other related patent applications include International Patent Application Nos. PCT/US04/33051, which published as WO/2005/043930 on May 12, 2005; PCT/US08/71346, which published as WO/2009/018212 on Feb. 5, 2009; PCT/US09/37755, which published as WO/2010/107441 on Sep. 23, 2010; and PCT/US09/37753, which published as WO/2010/107440 on Sep. 23, 2010. Each of the above-identified patents, patent applications, and published applications is hereby incorporated by reference herein in its entirety.

BACKGROUND OF THE INVENTION

Field of the Invention

The present disclosure relates to a safety system and method to avoid collision between vehicles and other assets in an underground mine based upon computer vision information, asset tracking system information, and motion information.

Description of the Related Art

As background, the following U.S. patents and published patent applications are hereby incorporated by reference herein in their entireties: U.S. Pat. No. 8,527,172; U.S. Pat. No. 8,280,621; US 20070021915, U.S. Pat. No. 6,553,130; U.S. Pat. No. 6,226,389; US 20040022416; and US 20130278440.

Prior art vehicle safety systems for detecting and communicating dangers are commonly comprised of one or more camera sensors, visual monitoring displays, and short range proximity sensors such as ultrasonic or infrared sensors. The camera sensors provide a view of areas not otherwise seen by the driver, and can be visible light sensors, short wave infrared sensors, or long wave infrared sensors, also referred to as thermal cameras. The visual monitoring display is positioned so that the driver can view what the video camera is capturing, and determine whether there is a danger of colliding with an object if the driver proceeds in the current direction. Proximity sensors can be paired with a camera system to detect objects within range and generate audible and visual warnings to the driver. These safety systems, whether limited to only a camera or proximity sensor or encompassing a combination of camera and proximity sensor, provide good localized coverage for detecting objects within a defined proximity, and communicating a level of danger to the driver to avoid collision between objects within a defined line-of-sight distance. Some prior art camera systems add infrared illuminators and sensors to obtain a visible picture of an otherwise visibly dark object. Similarly, some prior art camera systems use thermal imaging to provide a visible picture of naturally emitted infrared energy. Proximity sensors are often paired with these systems to detect and alert of dangers, while a small number of camera systems pair with asset tracking systems to communicate collision dangers of assets rather than generic objects or heat sources. In addition, some of these systems provide automated controls for slowing or stopping or providing audible and/or visual notification to multiple levels of danger.

Prior art tracking systems based on radio signal strength measurements between fixed and mobile objects can also determine positions of equipment and personnel. These systems measure distance between fixed radio transceivers at known locations and mobile radio transceivers using radio frequency (RF) signal strength. For example, a position for the mobile units can be determined using trilateration algorithms based on multiple received signal strength indicators (RSSI). Precision of the calculated location is subject to such factors as the quantity and bearings of the fixed transmitters, interference of the RF signals, and RF signal-to-noise measurements. At best, these systems provide an estimation of the distance to a tracked object and are insufficient as a collision avoidance system on their own.

The prior art systems described above are not reliable for determining, communicating, and providing collision avoidance safety response to predetermined assets and infrared emitting objects in non-line-of-sight conditions such as underground mines and tunnels. None of these systems comprise a collision avoidance system that detects and responds to moving object threats determined from a combination of thermal computer vision information, asset tracking system information, and motion information of individual objects.

SUMMARY OF THE INVENTION

The present disclosure provides a collision avoidance system comprising computer vision which may include thermal infrared or other types of video cameras and video analysis software that identifies and monitors important objects, an asset tracking system that provides asset location information using fixed and mobile radio units, and motion information from each mobile unit.

In embodiments of this disclosure, outputs from the computer vision system, asset tracking system, and motion information from each mobile unit are analyzed to achieve collision avoidance between known recognized assets and familiar objects identified as threats. In an exemplary scenario, humans and vehicles are considered assets and are given a unique radio unit for tracking. The assets are tracked using the wireless communications and tracking component. The vehicles are equipped with infrared video or other types of cameras and provide imaging to the computer vision component that identifies objects to the operator such as humans, vehicles, and electrical infrastructure. When the asset tracking data, motion data, and object identification data are combined, the system analyzes collision threats and provides multiple levels of warnings and actions to avoid collision between those assets.

In embodiments, as data is collected by both the computer vision and asset tracking software components, the collision avoidance algorithms evaluate their respective inputs, provide a confidence level for the output, and publish a message to be collected by the collision avoidance software component. The Collision Avoidance Component (CAC) combines all input, weighted by confidence, to form a current threat rating value (TRV). These TRVs are compared against specific thresholds, each with a specific, configurable function or action. The lower the TRV, the less operator action is required to avoid collision with another asset. For example, a low TRV may result in a simple audible beep that warns the asset operator of their proximity to another asset, while a higher TRV may result in a longer, louder tone to reduce speed, and an even higher TRV may automatically trigger a vehicle to stop in order to avoid colliding with another asset. Similarly, the TRV may trigger visible warnings according to the severity of the threat, alternatively or in addition or audible warnings.

One embodiment of the present disclosure provides a collision avoidance system for an underground mine environment where the system may comprise a computer vision component, an asset tracking component, and a motion detection component for calculating a directional velocity component for the asset tracking component. The collision avoidance component may be configured to receive inputs from the computer vision component, asset tracking component, and motion detection component and combine the inputs into an algorithm to produce an output that determines a warning or action for avoidance of a collision between a first asset and a second asset.

In any embodiment of this disclosure, the first asset or second asset may be a vehicle or human.

In any embodiment of this disclosure, the computer vision component may comprise a video imaging component, a computer processor, and a memory, wherein the computer processor receives or is configured to receive video image frames from the video imaging component and analyze them to identify assets according to a set of computer-executable instructions stored in the memory. The video imaging component may comprise one or more thermal infrared cameras which provide or are configured to provide a thermal image capture of an asset. The computer-executable instructions may identify or be configured to identify assets according to object classification algorithms configured to detect human forms, identify objects, and track motion based on one or more heat signature outlines contained in the thermal image capture. The object classification algorithms may determine or be configured to determine the position of a human selected from the group consisting of prone, supine, crouched, standing, sitting, crawling, squatting, and kneeling. Further, the object classification algorithms may recognize or be configured to recognize human faces or features such as eyes, ears, and mouth or recognize heat emitting infrastructure comprising batteries, motors, wires, communications and tracking components, and electrical power supplies.

In any embodiment of this disclosure, the computer-executable instructions may calculate or be configured to calculate the proximity of the human form by the size and heat intensity of the thermal image capture whereby a brighter image pixel indicates warmer areas and closer and larger humans span a greater number of pixels than do farther and smaller humans. The computer-vision component may be trained or be configured to be trained with positive and negative samples of assets in memory. The computer-vision component may be trained or be configured to be trained with positive samples by manually calibrating measurements using the formula $F=P*D/S$. The computer-vision component may be trained or be configured to be trained such that as the asset's pixel size changes in the image, the distance to the object is calculated with a new pixel value P using the formula $D=S*F/P$. The computer vision component may provide an output or be configured to provide an output that is a value based on the type and confidence of the asset determined in the video image frame.

In any embodiment of this disclosure, the asset tracking component may be based on fixed mesh radio nodes and mobile mesh radio nodes. A mobile mesh radio node may be placed on an asset and the asset tracking component may be configured such that a Received Signal Strength Indication (RSSI) between the mobile mesh radio node and surrounding fixed mesh radio nodes determines the location of the mobile mesh radio node. Further, the accuracy of the determined location of the mobile mesh radio node may be dependent on the placement and density of the fixed mesh radio nodes and the relative distance between the mobile mesh radio node and its surrounding fixed mesh radio nodes. The distance between fixed mesh radio nodes may be approximately 1500 feet and the asset tracking component may provide a tracking accuracy of better than 450 feet at least 98% of the time. The asset tracking component may include transmit-only beacon nodes which form a grid with spacing between beacon nodes of approximately 200 feet and the asset tracking component may provide a tracking accuracy of approximately 50 feet. The asset tracking component may assign or be configured to assign a confidence value to the determined location of the mobile mesh radio node based on its distance from another mobile mesh radio node.

In any embodiment of this disclosure, the motion detection component may comprise an accelerometer-based motion sensor device placed on the first asset and the motion detection component may determine or be configured to determine a directional velocity component comprising a speed and direction of travel of the first asset based on the accelerometer-based motion sensor. The motion detection component may further comprise an accelerometer-based motion sensor device placed on the second asset and the asset tracking component may determine or be configured to determine a directional velocity component comprising a speed and direction of travel of the second asset based on the accelerometer-based motion sensor. Further, the asset tracking component and motion detection component may determine or be configured to determine an intersection point and time to intersection point of the first asset and second asset.

In any embodiment of this disclosure, the collision avoidance component may produce an output or be configured to produce an output which is a proximity value between the first asset and the second asset, or which is a Threat Rating Value that determines the warning or action based on the inputs.

Another embodiment of the present disclosure provides a collision avoidance system for an underground mine environment where the system may comprise a computer vision component comprising a video imaging component comprising one or more thermal infrared cameras configured to provide video image frames comprising a thermal image capture of one or more assets, a computer processor, and a memory comprising a set of computer-executable instructions configured for instructing the computer processor to analyze video image frames received from the video imaging component to identify assets present in the thermal image capture. The system may further comprise an asset tracking component based on fixed mesh radio nodes and mobile mesh radio nodes where a mobile mesh radio node is placed on a first asset and the asset tracking component is configured to determine the location of the mobile mesh radio node based on a Received Signal Strength Indication (RSSI) between the mobile mesh radio node and surrounding fixed mesh radio nodes. The system may further comprise a motion detection component which is configured to determine a directional velocity component for the asset tracking component based on an accelerometer-based motion sensor device placed on the first asset, wherein the directional velocity component comprises a speed and direction of travel. In addition, the system may comprise a collision avoidance component which is configured to receive inputs from the computer vision component, asset tracking component, and motion detection component and combine the inputs into an algorithm programmed in a set of computer-executable instructions which instruct a processor to calculate a Threat Rating Value that determines a warning or action for the first asset to avoid collision with a second asset.

Another embodiment of the present disclosure provides a method for avoiding collisions in an underground mine environment. The method may comprise one or more of providing a thermal image of a first asset, identifying the type of asset in the thermal image using a computer processor directed by a set of computer-executable instructions to employ object classification algorithms, tracking the location of the first asset based on a Received Signal Strength Indication (RSSI) between a mobile mesh radio node placed on the first asset and surrounding fixed mesh radio nodes, and tracking the speed and direction of travel of the first asset based on an accelerometer placed on the first asset. Further, based on the type of asset and pixel characteristics in the thermal image, location of the first asset, and speed and direction of the first asset, the method may further comprise determining proximity information of the first asset in comparison to a second asset or determining a threat rating based on a rating algorithm, whereby the proximity information or threat rating determine a warning or action to avoid collision of the first asset with the second asset.

Another embodiment of the present disclosure provides a method for avoiding collisions in an underground mine environment. The method may comprise providing a thermal image of a first asset with a computer vision component and identifying the type of asset with the computer vision component. The computer vision component may comprise a video imaging component comprising one or more thermal infrared cameras which provide video image frames comprising a thermal image capture of an object, a computer processor, and a memory comprising a set of computer-executable instructions which instruct the computer processor to analyze video image frames received from the video imaging component to identify assets present in the thermal image capture, wherein the set of computer-executable instructions employ object classification algorithms to identify the asset. Further, the method may further comprise tracking the location of the first asset with an asset tracking component comprising fixed mesh radio nodes and mobile mesh radio nodes, wherein a mobile mesh radio node is placed on a first vehicle or a human and the asset tracking component determines the location of the mobile mesh radio node based on a Received Signal Strength Indication (RSSI) between the mobile mesh radio node and surrounding fixed mesh radio nodes. In addition, the method may further comprise tracking the speed and direction of travel of the first asset with a motion detection component which determines a directional velocity component for the asset tracking component based on an accelerometer-based motion sensor device placed on the first asset, wherein the directional velocity component comprises a speed and direction of travel. Still further, the method may comprise determining a Threat Rating Value through a collision avoidance component which receives inputs from the computer vision component, asset tracking component, and motion detection component and combines the inputs into an algorithm programmed in a set of computer-executable instructions which instruct a processor to calculate the Threat Rating Value. Further, the method may further comprise issuing a warning or action for the first asset to avoid collision with a second asset based on the Threat Rating Value.

The foregoing features and advantages will be apparent from the following, more detailed description of preferred embodiments of the present disclosure as illustrated in the accompanying drawings in which reference characters refer to the same parts throughout the various views.

BRIEF DESCRIPTION OF THE DRAWINGS

The accompanying drawings illustrate certain aspects of some of the embodiments of the present disclosure, and should not be used to limit or define the disclosure. Together with the written description the drawings serve to explain certain principles of the disclosure.

DETAILED DESCRIPTION OF VARIOUS EMBODIMENTS OF THE INVENTION

It is to be understood by persons of ordinary skill in the art that the following descriptions are provided for purposes of illustration and not for limitation. An artisan understands there are many variations that lie within the spirit of the disclosure and the scope of the appended claims. Unnecessary detail of known functions and operations may be omitted from the current description so as not to obscure the present disclosure.

As used herein, the term "asset" refers to a vehicle or human in an underground mine environment. The vehicle may be any vehicle employed in underground mining, including but not limited to a personnel transport vehicle, a rescue vehicle, a utility vehicle, a loader, a truck, a shearer, a drill, a crane, a flat bed, a lift, a plow, a roof support carrier, and may be powered by any source including electric, battery, diesel, and gasoline. The human may be any person in the underground mining environment, including but not limited to miners, managers, foremen, supervisors, and support personnel.

As used herein, the term "approximately" applied to a value refers to a value that ranges from minus 10% of the value to plus 10% of the value. Thus, "approximately" 100 would refer to any number from 90 to 110.

Figure 1:
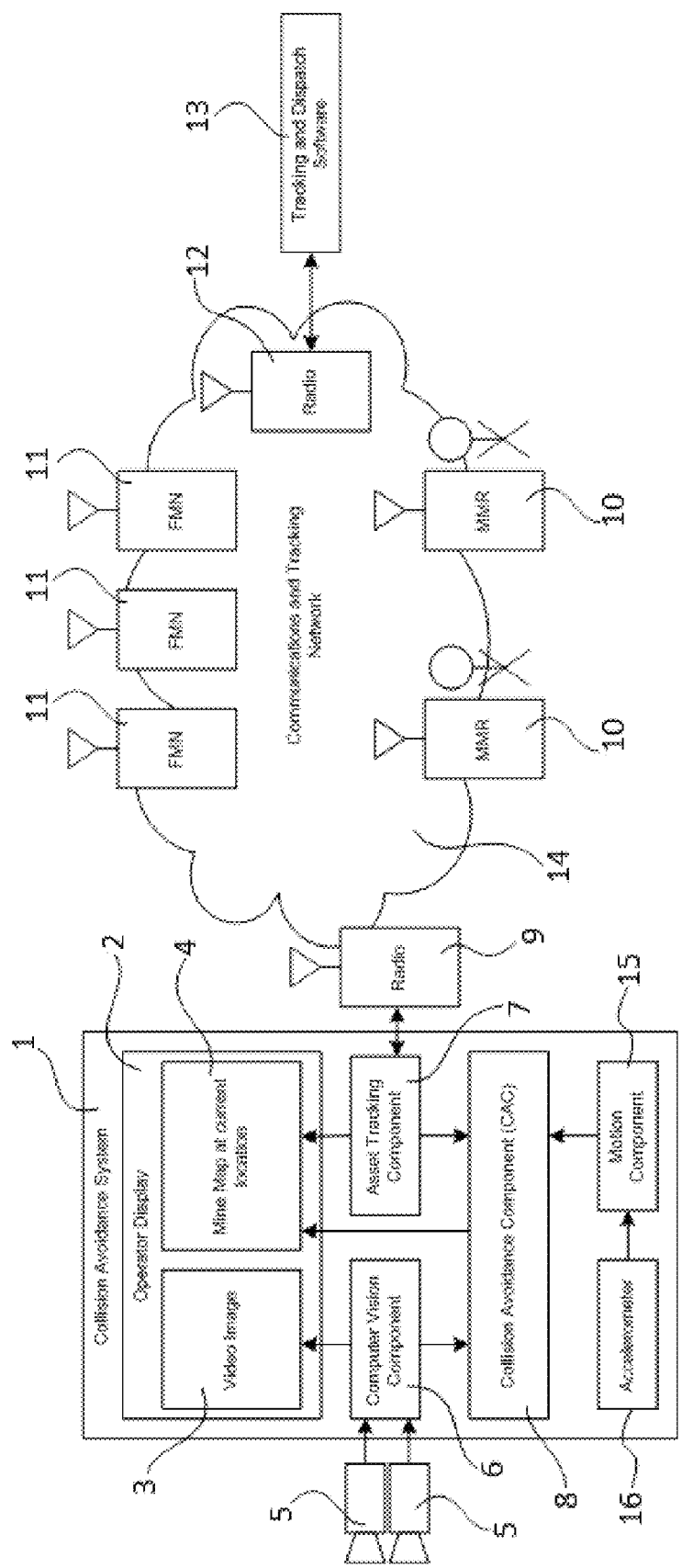
FIG. 1 is a schematic system overview diagram showing the system components and relationships to one another according to an embodiment of this disclosure.

FIG. 1 shows an embodiment of the collision avoidance system of the present disclosure comprised of a computer vision component 6 utilizing multiple cameras 5, an asset tracking system incorporating mobile radio devices 9, 10, asset tracking infrastructure 11, 12, 13, and asset tracking software component 7, a motion component 15 that provides speed and direction data by utilizing an accelerometer 16, and a collision avoidance component 8 which analyzes the data from multiple data inputs and takes action and sends an output to the Operator Display based on the calculated confidence level of determined collision threats.

Human operators diligently avoid collision of their vehicles with other vehicles and walkers when a threat is perceived; however, many situations, such as underground mining, do not provide workers with sufficient sensory inputs to perceive threats of collision. In underground mining, vehicle drivers may be located in a small space facing a wall, such as displayed in FIG. 5, and only have inches to turn their head to see other humans and vehicles. The human driver relies on very limited vision of their surroundings and very little audible input while in noisy environments. This disclosure seeks to track and identify assets to recognize collision threats, such as humans and vehicles, during operation of a moving vehicle, which proves to be especially useful in dark, busy, and often chaotic environments. The result is that collisions can be avoided by providing humans with valuable collision threat warnings in environments in which the human senses are not sufficient for detecting hazards and as well as taking action by stopping the vehicle before collision occurs.

Computer Vision Component

The computer vision component, an embodiment of which is displayed in FIG. 1, includes multiple cameras 5, a computer that receives multiple video feeds 1, and software that evaluates the video feeds to identify objects of interest 6. The multiple cameras may be placed anywhere in the mining environment where assets in the images may be recognized as potential collision hazards, including the front and/or rear of a vehicle or within the passages and tunnels of a mine such as at an intersection, entrance, exit, or anywhere along the passages and tunnels. The computer vision system collectively provides real-time collision threat detection through image object recognition that is weighted for confidence and used in final collision avoidance determinations. The computer vision system may achieve object recognition through a variety of algorithms and methods known in the art. Non-limiting examples include appearance-based or feature-based techniques including edges, gradients, Histogram of Oriented Gradients (HOG), Haar wavelets, and linear binary patterns. The algorithms and methods may also include, without limitation, extracted features and boosted learning algorithms, bag-of-words models, gradient-based and derivative-based matching approaches, Viola-Jones algorithm, template matching, image segmentation and blob analysis, local feature detectors such as SURF (Speeded Up Robust Features), or blob detection methods such as Maximally Stable Extremal Regions (MSER). As used herein, "object recognition" includes the recognition of human forms in addition to the recognition of non-human objects such as vehicles.

Figure 2:
FIG. 2 is a thermal image capture of a human taken by a thermal camera according to an embodiment of this disclosure.
Figure 3:
FIG. 3 is the same thermal image as FIG. 2 with an edge detection filter applied according to an embodiment of this disclosure.

In embodiments, the means for video imaging 5 or cameras 5, in FIG. 1 are cameras operating in the visible light, ultraviolet, and/or infrared spectrum. In one embodiment, the computer vision component uses one or more long wave infrared (LWIR) cameras that operate in the electromagnetic light spectrum with wavelengths between 8 and 15 micrometers. However, in other embodiments, the cameras are infrared cameras operating anywhere in the range of 700 nanometers to 1 millimeter, including short wave, medium wave, or long wave infrared. This is referred to as the "thermal imaging" or "thermal infrared" region whereby the optical sensor can passively obtain an image based on variations in temperature in the subject. No external illumination from man-made or natural sources is required. The resulting exemplary image capture shown in FIG. 2 is a thermally-enhanced scenario of the subject. FIG. 3 is the same exemplary thermal image capture as FIG. 2 with an edge detection filter applied, and FIG. 4 is the same exemplary thermal image capture as FIG. 2 with a high heat threshold applied.

Figure 4:
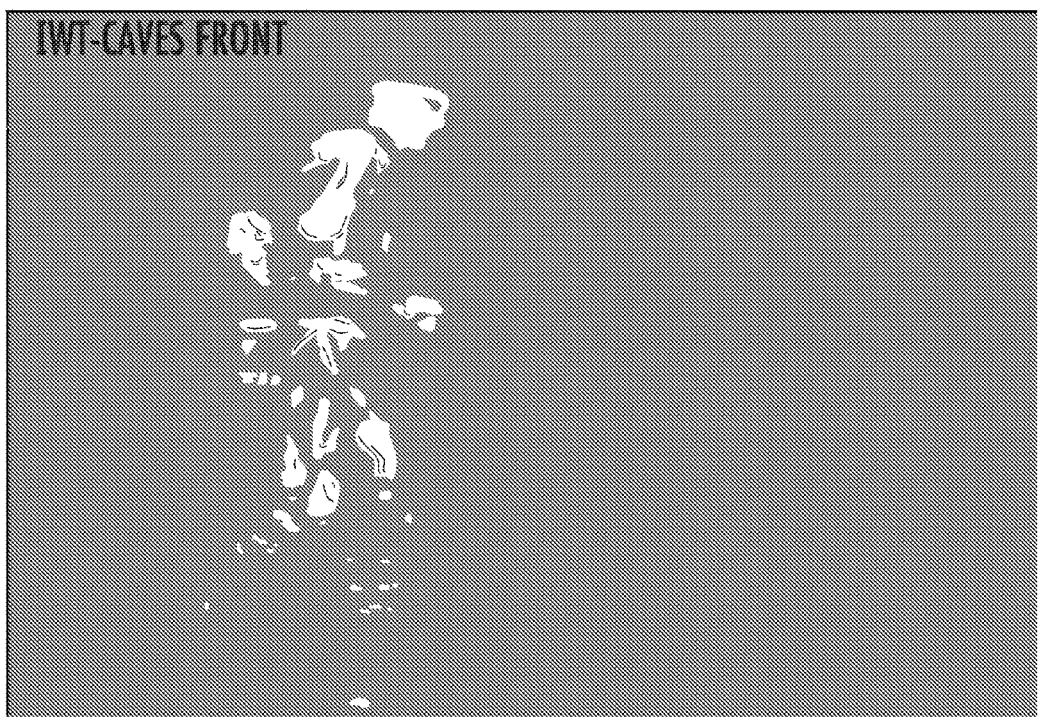
FIG. 4 is the same thermal image as FIG. 2 with a high heat threshold applied according to an embodiment of this disclosure.

The use of a thermal camera allows for humans to be identified even in dusty situations and heavy clothing as shown in FIGS. 2-4. Traditional day imagers are not capable of capturing light beyond heavy airborne dust particles. Likewise, without enough light, day imagers are incapable of producing valuable images for identifying objects. The thermal camera in this disclosure captures useful images in completely dark and very dusty environments, and is unaffected by lack of light visible by humans and is suitable for most dusty situations whereby a human can breathe, but not see well. Further, the video component 5 of the computer vision component may be one or more ultraviolet cameras instead of thermal cameras or a combination of thermal and ultraviolet cameras. The ultraviolet camera(s) may capture images illuminated by a black light, or UV-A lamp, or a UV-B lamp or UV-C lamp. The ultraviolet camera(s) may capture ultraviolet images with or without an edge detection filter, and the object recognition algorithms or methods may be applied to the ultraviolet images.

Multiple image frames are taken to form a continual live video feed for analysis. The number of image frames per second (fps) may range from 10 fps to 30 fps, 5 fps to 50 fps, or 1 fps to 100 fps in various embodiments. Video analysis is performed by the computer image software on each frame in real-time as the image frames are acquired from the camera. Previous frame analysis results are stored for comparison with incoming frames as they are captured. Real-time image processing and comparison with previous images gives the computer vision component the ability to confidently determine short range line-of-sight collision threats, distance of threats, and speed of threats as they appear and progress.

Object classification algorithms perform the role of computer vision and automated machine perception to identify the objects in the analyzed image frames. These algorithms have the ability to detect human forms, identify objects, and track motion. Using the heat signature, visible, or ultraviolet image outline contained in the images, the algorithms determine if the object is a human form, even if the person is in a prone, supine, crouched, upright/standing, sitting, crawling, squatting, kneeling, or other natural human position. In one embodiment, the proximity of the human is calculated by the size and heat intensity whereby warmer areas are indicated by a brighter image pixel and closer and larger humans span a greater number of pixels than do farther and smaller human. Given a recognized body position of the human, comparisons are made to subsequent findings and distance is measured. In other embodiments, other types of proximity sensors may be used in substitution of or in addition to the heat intensity measurements, including sensors based on LIDAR (light detection and ranging), RADAR (radio detection and ranging), SONAR (sound navigation and ranging), ultrasonic, or other infrared sensors.

Confident, acceptable object recognition is achieved by training the computer vision software with positive samples of objects that should be detected, and by providing negative samples whereby no desired objects to be detected exist. When training and calibrating the computer vision software with positive samples, measurements are first manually calibrated using the formula:

$$F = P \cdot D / S$$

Where:
F is the focal length of the camera
P is the number of pixels wide of the subject
D is the distance from the camera to the subject
S is the size of the subject As the subject's pixel size changes in the image, the distance to the object is calculated with a new pixel value P using the formula:

$$D = S \cdot F / P$$

The output of the video analysis is a value based on the type and confidence of the object determined in the scene and multiple values that are continuously fed to the collision avoidance component in real-time. Two distinct values are provided, one for human forms and another for fixed and mobile objects. The higher the value, the greater the confidence that the video analysis correctly identified the particular shape. Each value is also accompanied by an amplitude level which represents how close the object is to the camera. A large outline and/or a high heat signature would result in a large amplitude level.

Asset Tracking Component

Figure 5:
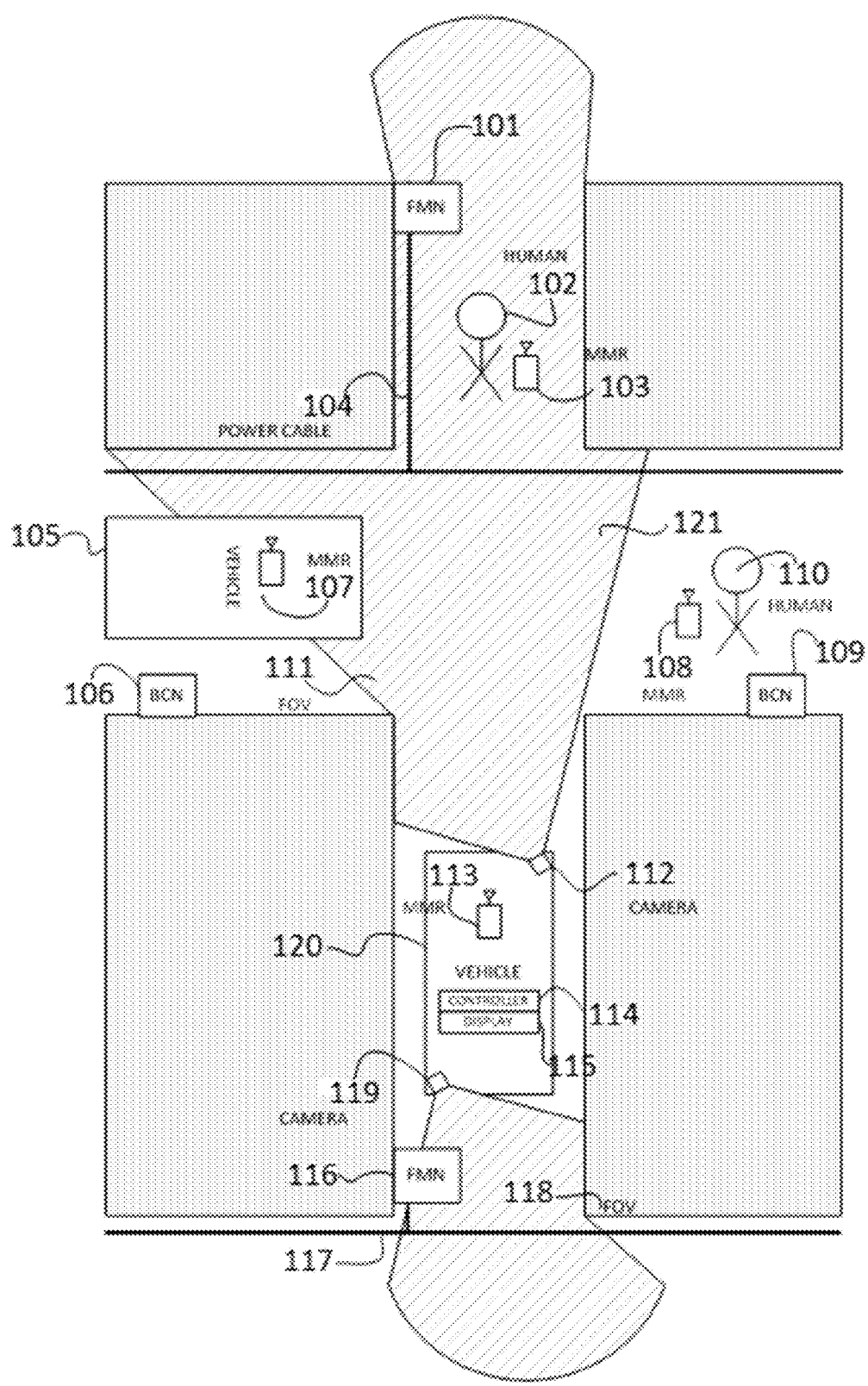
FIG. 5 is a schematic diagram showing an exemplary deployment scenario in an underground mine where the collision avoidance system is implemented according to an embodiment of this disclosure.

Another embodiment of this disclosure is a wireless communication and tracking system (i.e. asset tracking component) for an underground mine environment, shown in FIG. 5, based on fixed radio and mobile radio nodes distributed within the underground mine environment. By way of background, the following patents and published patent applications, each incorporated herein by reference in their entireties, illustrate wireless communication systems: U.S. Pat. No. 7,119,676; U.S. Pat. No. 7,983,685; U.S. Pat. No. 8,244,260; and U.S. Pat. No. 8,385,322. In particular, US 20120008542 (U.S. application Ser. No. 13/257,378) and US 20120011365 (U.S. application Ser. No. 13/257,369), also incorporated by reference in their entireties, provide a detailed description of wireless communications systems based on fixed radio and mobile radio nodes for an underground mining environment and may be useful for providing additional instruction for this portion of the disclosure. The system uses the Received Signal Strength Indication (RSSI) between Fixed Mesh Radio Nodes (FMN), and Mobile Mesh Radio Nodes (MMRs) to determine the location of the mobile node. The accuracy is dependent on the placement and density of FMN's 101, 116 and the relative distance between a mobile radio 107, 108, 113 and its surrounding FMN's. A tracking accuracy of better than 450 feet at least 98% of the time is accomplished with an FMN distance of 1500 feet. The Fixed and Mobile Mesh Radio Nodes can be placed anywhere in the underground mine environment, with the Mobile Mesh Radio Nodes placed on objects that are capable of changing location and are thus potential hazards for collision, such as a worker or other human or a vehicle within the underground mining environment. In this way, the positions of the humans and/or vehicles in the underground mining environment can be tracked by the RSSI between each placed Mobile Mesh Radio Node and its surrounding Fixed Mesh Radio Nodes or by the RSSI between two adjacent Mobile Mesh Radio Nodes placed on vehicles and/or humans.

The Fixed Mesh Radio Nodes and Mobile Mesh Radio Nodes form part of a Wireless Mesh Network (WMN). The Fixed Mesh Node FMN is a stationary dual-transceiver mesh radio unit operates on the WMN. Multiple units operate together to form the semi-static infrastructure for the WMN. Each FMN has the capability to coordinate individual clusters within the wireless mesh network WMN and route data through the network between mobile nodes and to a Gateway Node. An FMN can also communicate through a wired backbone headend with a wired backbone, such as a leaky feeder system, as well as form the core links for WMN.

Mobile Mesh Radio (MMR) is a portable device carried by personnel that allows them to have voice and data communication with a Network Operations Center and/or other personnel equipped with an MMR. MMR can also be a relay link between another MMR and an FMN, or between a sensor mesh node (SMN) and an FMN.

The accuracy may be enhanced to approximately 50 feet by adding transmit only Beacon Nodes (BCN) to form a grid with spacing of approximately 200 feet.

To improve the average tracking accuracy over a time interval, a maximum speed is applied to the estimated position. If the newly calculated position is farther from the previous position than which can be reached by traveling at the maximum speed, the new position's distance is capped by the maximum distance allowed given the time difference of the two calculations. The bearing between the two positions is unaffected. The maximum speed value is set by the tracking system and is based whether the tracked mobile object is identified as human or a vehicle.

The tracking confidence value assigned to a tracked device is determined by several factors. A strong RSSI value indicates that two tracked objects are close to each other. If the RF signal is from another mobile (non-fixed) device, the position calculation accuracy is reduced accordingly based on the distance of the transmitting device. Fixed infrastructure devices have very high position accuracy and are algorithmically favored in the mobile device's position calculation.

The bearing or direction of travel is also a factor in the tracking analysis. Based on an accelerometer-based motion sensor device in the mobile objects, the speed and direction of travel is measured and transmitted over the wireless Asset Tracking Component along with its unique ID. The collision avoidance tracking algorithm determines if the direction of travel of other mobile objects will intersect with its current path (forward or reverse). If the two paths do not intersect, the directional velocity component will be near zero. If the paths intersect, the intersection point will result in a higher directional velocity factor. Time to the intersection point (based on the calculated speed) will also affect the directional velocity component.

Persons with a tracked device riding in the vehicle present a special case for the vehicle's collision avoidance alarms. The collision avoidance algorithm detects that they are co-located and over-rides the alarms. The de-activation period is extended if the RSSI values are very high and shortened when the RSSI fall below a configured threshold.

Motion Component

Aiding the Collision Avoidance Component in determining when and how to react to a collision threat is the Motion component. This component provides two valuable metrics in determining if a collision could occur: direction of travel and speed. Without adequate knowledge of these two metrics, proper collision avoidance would not be possible.

In embodiments, the motion component may also be considered distributed within the underground mine environment, as it includes sensors placed on one or more mobile objects (i.e. vehicles) within the underground mind environment. Both direction of travel and speed are acquired from the motion sensor of each mobile object. When a change in gravitational force is detected, the motion component evaluates whether or not the change is useful for collision avoidance. For instance, if a coal shuttle vehicle receives a heavy load of coal, the sudden downward thrust of the vehicle will trigger the accelerometer and produce data that is not associated with avoiding collision since the shuttle vehicle is not moving forward or backward. However, if the coal shuttle vehicle moves forward or backward, it will produce useful gravitational force metrics for determining direction and speed to avoid collision with nearby humans and vehicles. The accelerometer may be any type of accelerometer known in the art, analog or digital, including without limitation capacitive, piezoelectric, piezoresistive, Hall Effect, and magnetoresistive accelerometers.

Collision Avoidance

The Collision Avoidance Component (CAC) 8 embodiment shown in FIG. 1 evaluates the inputs from the video analysis results 6 and the asset tracking system 7. In embodiments, the CAC may be provided on a host vehicle for use or interaction with the operator of the vehicle so that collisions of the vehicle with other assets may be avoided. The CAC combines the inputs to formulate a threat rating value (TRV) which is then used as the basis for an appropriate action. The TRV may determine a variety of actions on a vehicle hosting the CAC, including visible or audible warnings (or their combination), displays of video, images, or messages, and/or an automatic control of a vehicle to avoid a collision. The audible warnings may include a sound such as a beep, tone, horn, or siren or may be a computer-synthesized voice that issues a warning such as "approaching human", "approaching vehicle 50 yards ahead", or "slow down to 5 mph". The visible alarms may include a colored, blinking, and/or rotating light indicating the severity and imminence of a collision threat that may alert both the driver of a vehicle and neighboring vehicles or humans. The TRV may further determine visible messages displayed on a monitor or display that may provide for similar warnings. The automatic control may include automatic application of the brakes of the vehicle, shifting to a lower gear, and/or a change in steering of the vehicle. The action may also include display of an image of an object in a field of view or an indication of a RSSI of a nearby fixed or mobile mesh radio node on a monitor or display.

Embodiments of the high level algorithms are demonstrated below:

Threat rating value for tracking system input 1:

$$TRV_{TS1} = C_{TS1} \cdot D_{TS1} \cdot V_{TS1}$$

Threat rating value for tracking system input n:

$$TRV_{TSn} = C_{TSn} \cdot D_{TSn} \cdot V_{TSn}$$

Threat rating for Collision Avoidance Component:

$$TRV = (K_{VH} \cdot A_{VH} \cdot V_{VH}) + (K_{VO} \cdot A_{VO} \cdot V_{VO}) + (K_{TS} \cdot \max[TRV_{TS1} \ldots TRV_{TSn}])$$

Where:

$K_{VH}$=weight constant for the host computer vision component input $A_{VH}$=amplitude level for the host computer vision component input $V_{VH}$=value of the host computer vision component input $K_{VO}$=weight constant for the object computer vision component input $A_{VO}$=amplitude level for the object computer vision component input $V_{VO}$=value of the object computer vision component input $K_{TS}$=weight constant for the asset tracking component input $C_{TS1}$=confidence level for the first asset tracking component input $D_{TS1}$=directional velocity component for the first asset tracking component input $V_{TS1}$=value of the first asset tracking component input $TRV_{TS1}$=threat rating value for the $n^{th}$ asset tracking component input $C_{TSn}$=confidence level for the $n^{th}$ asset tracking component input $D_{TSn}$=directional velocity component for the $n^{th}$ asset tracking component input $V_{TSn}$=value of the $n^{th}$ asset tracking component input $TRV_{TSn}$=threat rating value for the $n^{th}$ asset tracking system input TRV=threat rating value for the Collision Avoidance Component FIG. 5 shows an exemplary implementation in an underground mine. The vehicle 120 holds the tracking computer 1 comprised of 114 and 115, as well as cameras 112 and 119. While the vehicle 120 travels, the cameras 112 and 119 continuously capture thermal images at 10 to 30 fps. The thermal images are processed for recognizable objects FMN's 101 and 116, BCNs 106 and 109, and power lines 117 and 104. These objects emit heat similar to a human or vehicle, however they do not directly pose a collision threat to the vehicle, therefore they are detected and ruled out as human or vehicle heat sources.

Figure 6:
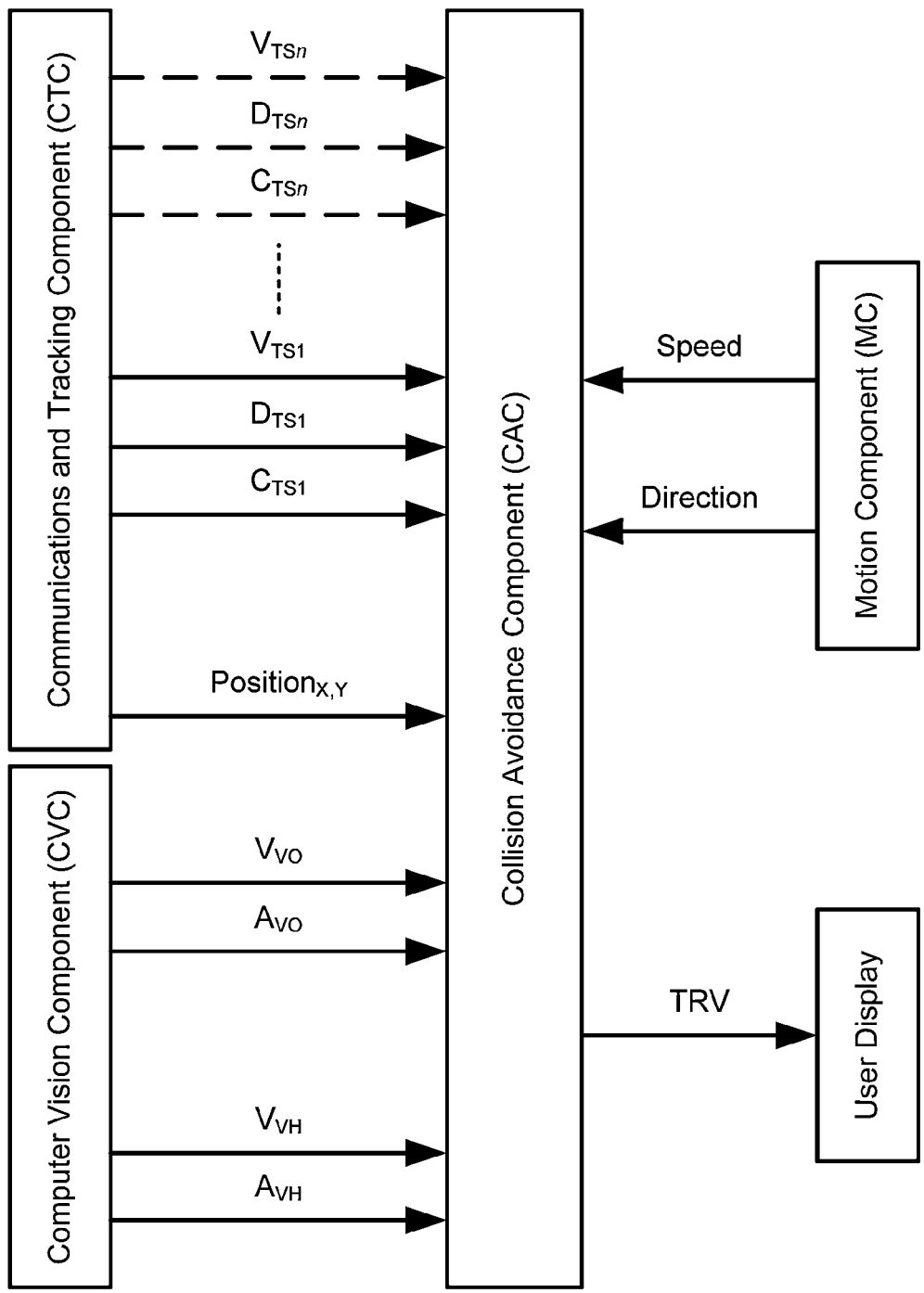
FIG. 6 is a schematic tracking analysis diagram with inputs to the Collision Avoidance Component from the camera, asset tracking and motion components according to an embodiment of this disclosure.

FIG. 5 shows an embodiment in which the humans and vehicles have MMRs 103, 107, 108, and 113. The vehicle MMRs 107 and 113 are used by the tracking software 7 to identify assets that should be considered collision threats. Even though human 110 is not visible to vehicle 120, the tracking software identifies that there is a human 110 close by and feeds that information to the CAC. Lastly, the computer vision system identifies the vehicle object 105, as it dangerously approaches the vehicle 120 at the tunnel crosscut and likewise passes the TRV to the CAC. The CAC is able at this time to calculate the TRV and take appropriate action using the data input from the computer vision system and asset tracking system. FIG. 6 is a schematic tracking analysis diagram with inputs to the Collision Avoidance Component from the camera, asset tracking and motion components.

Figure 7:
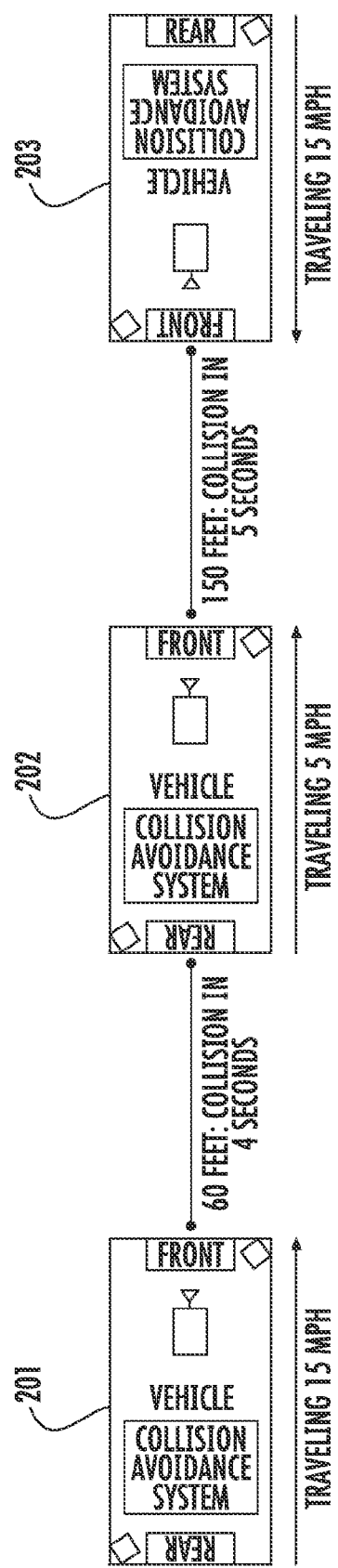
FIG. 7 is a schematic diagram of exemplary scenarios where underground vehicles can collide according to embodiments of this disclosure.

FIG. 7 depicts exemplary multiple vehicle-to-vehicle scenarios where collision is avoided using an embodiment of the method of this disclosure. Vehicle 201 and vehicle 202 are travelling in the same direction and on the exact same path, but not at the same speed. Vehicle 201 is travelling 15 miles per hour (MPH), which is 10 MPH faster than the vehicle in front of it, 202, which is travelling at 5 MPH only 60 feet ahead. At these speeds, vehicle 201 will collide with vehicle 202 in approximately four seconds. Similarly, vehicle 202 is travelling at 5 MPH, and vehicle 203 is travelling at 15 MPH directly toward vehicle 202 150 feet away. At these speeds, vehicle 202 and vehicle 203 will collide in approximately five seconds.

In the first scenario, the computer vision component of vehicle 201 identifies the vehicle ahead, and the computer vision component of vehicle 202 identifies the vehicle behind. The vehicle objects are recognized, and their speeds and distances are continuously calculated while travelling. The asset tracking component likewise determines that the vehicle assets are nearby, and determines the location of each vehicle. Last, the motion component on each vehicle determines its own speed and direction of travel. On each vehicle, the values are then passed to the collision avoidance component, and in this scenario, vehicle 202 is alerted of immediate danger of collision, and vehicle 201 slows to a safe speed of four MPH to allow vehicle 202 to distance itself farther from potential collision.

In the second scenario, all of the collision determination steps are taken as they were in the first scenario. The difference here is that both vehicle 202 and vehicle 203 alert their drivers and reduce to a safe speed below five MPH to allow the drivers to carry on in a safe manner.

Figure 8:
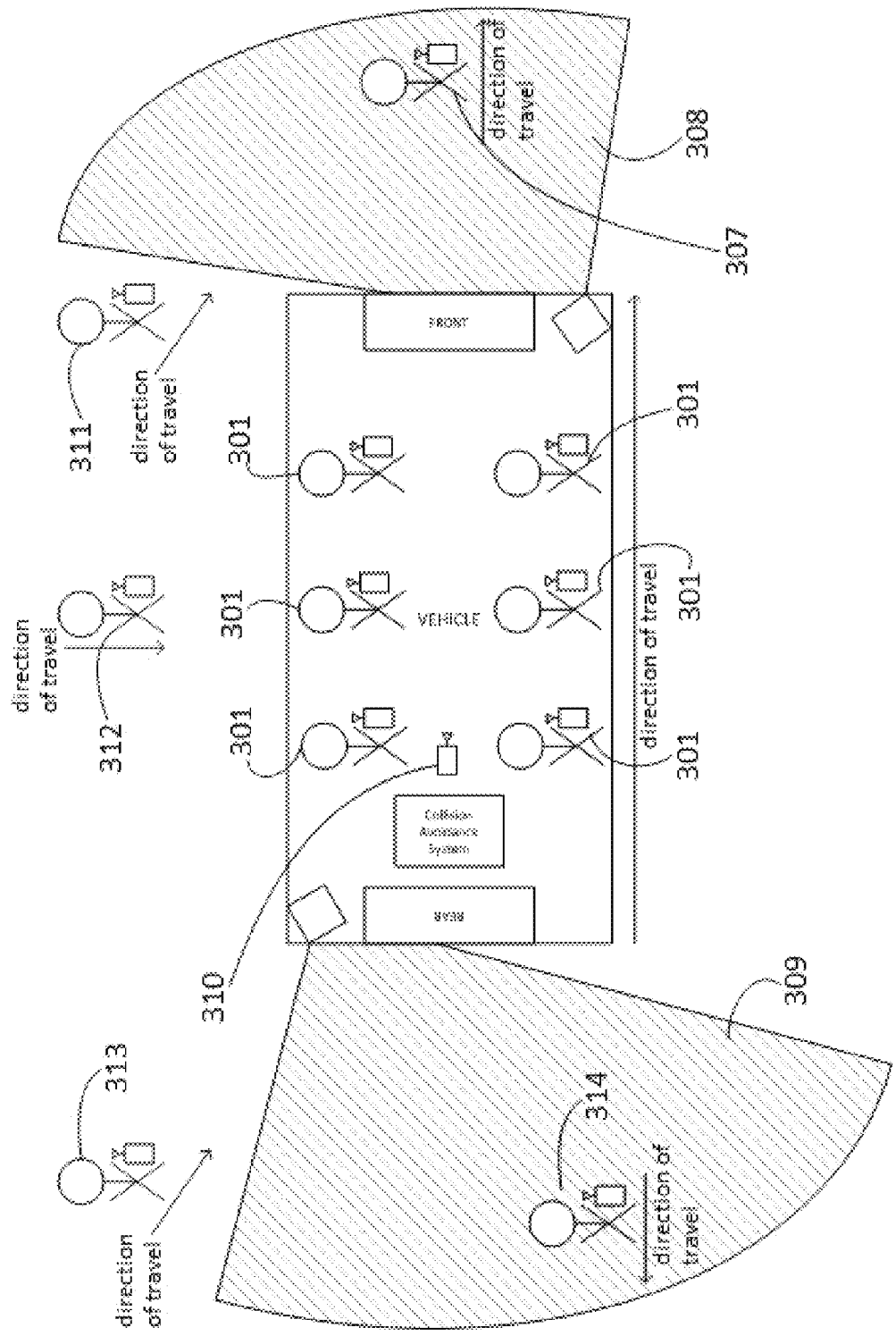
FIG. 8 is a schematic diagram of exemplary scenarios where a vehicle can collide with humans according to embodiments of this disclosure.

FIG. 8 depicts exemplary scenarios where humans may or may not be in danger, and how the said method addresses each situation in order to avoid collision. First, the vehicle depicted holds MMR 310 which is part of the asset tracking system. Because of the location of MMR 310, it would seem that any other MMR nearby would trigger collision avoidance. This scenario, then, addresses vehicles that carry assets with an MMR, such as humans with MMRs 301. The collision avoidance system vehicle must be stopped for on-boarding of additional assets. The additional assets must accept the on-boarding request, and will remain on-board until the vehicle has moved and again come to a complete stop. When the humans move away from the vehicle, they are automatically off-boarded. At any point, if a collision danger is perceived by the computer vision component of an asset that is on-board, it will override the on-boarding agreement and avoid collision. Such a scenario might occur if a human removes their MMR and is in the vision of a camera.

The human 307 is in the front camera field of view 308, and travelling the same direction as the vehicle. In this instance, the human can safely travel in the same path as the vehicle as long as the vehicle isn't travelling too close or approaching too fast. Sudden changes in the perceived danger of collision will alert both the vehicle and the human.

Human 311 is travelling nearby the vehicle, but not directly in its path. This scenario provides warning of nearby danger, but does not stop the vehicle as no collision is imminent. As human 311 enters the field of view 308 at close proximity, however, the vehicle will be caused to halt and avoid colliding with the human.

Human 312 is travelling perpendicular to the vehicle, such as in an underground mine crosscut. As the human approaches the vehicle, an audible and/or visible warning is provided for both parties, and the vehicle is halted if the human gets too close. This scenario is quite common in underground mines since crosscuts provide safe shelter for humans while vehicles pass. The vehicle's speed, however, will be reduced as a chance exists that the vehicle may turn into the crosscut where the human is located.

Human 313, similar to human 311, is travelling nearby the vehicle, and into a camera's field of view. The difference is that human 313 is approaching the rear of the vehicle travelling in a similar direction as the vehicle. The human is not in high danger of collision with the vehicle, so human 313 will be alerted of nearby danger, but the vehicle will not be halted.

Human 314 is directly in the vehicle's rear camera field of view 309 but is travelling away from the vehicle. Similar to human 313, human 314 will be warned of nearby danger, but the vehicle will continue on at a safe speed, since there is not an imminent risk of collision with human 314.

It will be understood that the various processes, operations, and/or algorithms of described and/or depicted in this disclosure may be carried out by a group of computer-executable instructions that may be organized into routines, subroutines, procedures, objects, methods, functions, or any other organization of computer-executable instructions that is known or becomes known to a skilled artisan in light of this disclosure, where the computer-executable instructions are configured to direct a computer or other data processing device to perform one or more of the specified processes, operations, and/or algorithms. Embodiments of this disclosure include one or more computers or devices loaded with a set of the computer-executable instructions described herein wherein the one or more computers or devices are instructed and configured to carry out the processes, operations, and/or algorithms of the disclosure. The computer or device performing the specified processes, operations, and/or algorithms may comprise at least one processing element such as a central processing unit and a form of computer-readable memory which may include random-access memory (RAM) or read-only memory (ROM). In embodiments, the computer or device may be positioned on one or more vehicles as one, several, or all of the components of a Collision Avoidance System described in this disclosure. The computer-executable instructions can be embedded in computer hardware or stored in the computer-readable memory such that the computer or device may be directed to perform one or more of the processes, operations, and/or algorithms depicted and/or described herein. Embodiments of this disclosure also include a computer program product comprising one or more computer files comprising a set of computer-executable instructions for performing one or more of the processes, operations, and/or algorithms described and/or depicted herein. In exemplary embodiments, the files may be stored contiguously or non-contiguously on a computer-readable medium, in computer-readable memory on a single computer, or distributed across multiple computers. Embodiments of this disclosure also include a computer readable medium comprising one or more computer files comprising a set of computer-executable instructions for performing one or more of the calculations, processes, operations, and/or algorithms described and/or depicted herein. Further, embodiments of the disclosure include a computer program product comprising the computer files, either in the form of the computer-readable medium comprising the computer files and, optionally, made available to a consumer through packaging, or alternatively made available to a consumer through electronic distribution. As used herein, a "computer-readable medium includes any kind of computer memory such as floppy disks, conventional hard disks, CD-ROMS, Flash ROMS, non-volatile ROM, electrically erasable programmable read-only memory (EEPROM), and RAM.

A skilled artisan will further appreciate, in light of this disclosure, how the processes, operations, and/or algorithms can be implemented, in addition to software, using hardware or firmware. As such, as used herein, the operations in this disclosure can be implemented in a system comprising any combination of software, hardware, or firmware.

Embodiments of this disclosure may include a user interface which may be used in conjunction with the computer-executable instructions. For example, the user interface may include a graphical user interface configured to allow a user to access a camera image or video feed, display a Received Signal Strength Indication of a nearby fixed or mobile mesh radio node, display one or more warnings or alarms to take action to avoid a collision, including a message. The message may indicate the level of threat of collision with an asset and/or instructions designed to avoid collision such as to decelerate or execute an evasive maneuver. The graphical user interface may also communicate that such an action was automatically taken by the collision avoidance component. The graphical user interface may allow a user to perform these tasks through the use of text fields, check boxes, pull-downs, command buttons, and the like. A skilled artisan will appreciate how such graphical features may be implemented for performing the tasks of this disclosure.

Such graphical controls and components are reusable class files that are delivered with a programming language. For example, pull-down menus may be implemented in an object-oriented programming language wherein the menu and its options can be defined with program code. Further, some programming languages integrated development environments (IDEs) provide for a menu designer, a graphical tool that allows programmers to develop their own menus and menu options. The menu designers provide a series of statements behind the scenes that a programmer could have created on their own. The menu options may then be associated with an event handler code that ties the option to specific functions. Text fields, check boxes, and command buttons may be implemented similarly through the use of code or graphical tools. A skilled artisan can appreciate that the design of such graphical controls and components is routine in the art.

The present disclosure has been described with reference to particular embodiments having various features. In light of the disclosure provided above, it will be apparent to those skilled in the art that various modifications and variations can be made in the practice of the present disclosure without departing from the scope or spirit of the disclosure. One skilled in the art will recognize that the disclosed features may be used singularly, in any combination, or omitted based on the requirements and specifications of a given application or design. For example, any of the methods described can be implemented in systems according to the disclosure, while any of the systems described can be configured to operate any of the inventive methods. Other embodiments of the disclosure will be apparent to those skilled in the art from consideration of the specification and practice of the disclosure.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the disclosure fall within the scope of the disclosure. Further, all of the references cited in this disclosure including published patents, published patent applications, and non-patent literature are each individually incorporated by reference herein in their entireties and as such are intended to provide an efficient way of supplementing the enabling disclosure as well as provide background detailing the level of ordinary skill in the art.

The invention claimed is:

1. A collision avoidance system, the system comprising:
a computer vision component comprising:
   an imaging modality comprising one or more thermal infrared or ultraviolet cameras configured to provide an image capture of a region of interest;
   a computer processor; and
   a memory comprising a set of computer-executable instructions configured for instructing the computer processor to analyze the thermal image capture to identify assets present in the region of interest;
an asset tracking component based on fixed mesh radio nodes and mobile mesh radio nodes, wherein a mobile mesh radio node is placed on a first asset and the asset tracking component is configured to determine the location of the mobile mesh radio node based on a Received Signal Strength Indication (RSSI) between the mobile mesh radio node and surrounding fixed mesh radio nodes;
at least one motion detection component capable of determining a directional velocity component for the asset tracking component and comprising an accelerometer-based motion sensor device placed on the first asset, wherein the directional velocity component comprises a speed and direction of travel; and
a collision avoidance component which is configured to receive inputs from the computer vision component, the asset tracking component, and the motion detection component and combine the inputs into a collision avoidance algorithm programmed in a set of computer-executable instructions which instruct a computer processor to calculate a Threat Rating Value that determines a warning or action for the first asset to avoid collision with a second asset;
wherein the computer-executable instructions are configured to instruct the computer processor to calculate the Threat Rating Value as:

$$TRV = (K_{VH} \cdot A_{VH} \cdot V_{VH}) + (K_{VO} \cdot A_{VO} \cdot V_{VO}) + (K_{TS} \cdot \max[TRV_{TS1} \ldots TRV_{TSn}])$$

wherein:

$$TRV_{TS1} = C_{TS1} \cdot D_{TS1} \cdot V_{TS1}$$

$$TRV_{TSn} = C_{TSn} \cdot D_{TSn} \cdot V_{TSn}$$

$K_{VH}$=Weight constant for a host computer vision component input
$A_{VH}$=Amplitude level for the host computer vision component input
$V_{VH}$=Value of the host computer vision component input
$K_{VO}$=Weight constant for an object computer vision component input
$A_{VO}$=Amplitude level for the object computer vision component input
$V_{VO}$=Value of the object computer vision component input
$K_{TS}$=Weight constant for the asset tracking component input
$V_{TS1}$=Value of a first asset tracking component input
$TRV_{TS1}$=Threat rating value for an $n^{th}$ asset tracking component input
$C_{TSn}$=Confidence level for the $n^{th}$ asset tracking component input
$D_{TSn}$=Directional velocity component for the $n^{th}$ asset tracking component input
$V_{TSn}$=Value of the $n^{th}$ asset tracking component input $TRV_{TSn}$=Threat rating value for the n$^{th}$ asset tracking component input TRV=Threat rating value for the Collision Avoidance Component.

2. The collision avoidance system of claim 1, wherein the first asset is a vehicle or human and the second asset is a vehicle or human.

3. The collision avoidance system of claim 1, wherein object recognition is achieved by training the computer vision component with positive samples of objects to be detected and with negative samples wherein no objects to be detected exist, wherein positive sample measurements are manually calibrated using the formula:

$$F=P*D/S \text{ where}$$

F is the focal length of the camera;
P is the number of pixels wide of the subject;
D is the distance from the camera to the subject; and
S is the size of the subject.

4. The collision avoidance system of claim 1, wherein the collision avoidance algorithm is capable of detecting co-location of humans riding in a vehicle and overriding the warning or action on a user interface for the system and the mobile mesh radio nodes where a vehicle must be stopped for on-boarding and off-boarding of human assets.

5. The collision avoidance system of claim 1, wherein:
the motion tracking component comprises an accelerometer placed on each vehicle and each human asset that is configured to provide a speed, direction of travel and unique ID for each human and vehicle;
the imaging component comprises a thermal or ultraviolet imaging component on each vehicle to capture images in dark and dusty environments using one or more passive long wave infrared cameras and/or ultraviolet cameras configured for imaging one or more areas not otherwise capable of being seen by a driver to display real-time live video to the driver and real-time object recognition corresponding to known objects including humans, vehicles, and electrical infrastructure; and
the collision avoidance algorithm is on each vehicle and is configured to use position information, directional velocity information, a unique ID for each mobile object, and object recognition information as input values to calculate proximity between assets, speed and direction of travel between assets, and a threat rating value between the first asset and the second asset.

6. The collision avoidance system of claim 1, wherein the collision avoidance component is configured to receive inputs comprising object recognition information from the computer vision component, position information from the asset tracking component, and directional velocity information from the motion detection component and combine the inputs into the algorithm.

7. The system of claim 1, wherein the asset tracking component comprises a plurality of mobile mesh radio nodes and a plurality of fixed mesh radio nodes wherein:
1. a mobile mesh radio node is placed on each mobile vehicular asset and mobile human asset and the fixed mesh radio nodes are placed on fixed objects in the underground mine; and
2. the mobile mesh radio nodes and the fixed mesh radio nodes together form a Wireless Mesh Network capable of determining position information of each of the mobile vehicular assets and each of the mobile human assets in non-line-of-sight (NLOS) conditions in an underground mine environment based on a tracking algorithm that uses Received Signal Strength Indication (RSSI) calculations from the fixed mesh radio nodes which together comprise multiple surrounding fixed mesh radio nodes with known locations.

8. The system of claim 1, wherein the computer vision component comprises one or more camera and one or more object recognition algorithms.

9. The system of claim 1, wherein the computer vision component comprises one or more long wave infrared cameras or ultraviolet cameras and the imaging is capable of being captured at a rate of 1 to 100 frames per second to form a continual live video feed for analysis to perform real-time image processing and object recognition to determine short range line-of-sight collision threats, distance of threats, and/or speed of threats.

10. The system of claim 8, wherein one or more of the object recognition algorithms comprise appearance-based or feature-based techniques chosen from edges, gradients, Histogram of Oriented Gradients (HOG), Haar wavelets, linear binary patterns, extracted features and boosted learning algorithms, bag-of-words models, gradient-based and derivative-based matching approaches, Viola-Jones algorithm, template matching, image segmentation and blob analysis, local feature detectors, Speeded Up Robust Features (SURF), blob detection methods, or Maximally Stable Extremal Regions (MSER) and provides a realtime computer vision system capable of performing object recognition on thermal image frames received as a video feed for one or more of:
object recognition of humans;
object recognition of human faces;
object recognition of vehicles; and
object recognition of heat emitting infrastructure.

11. The system of claim 1, wherein the asset tracking component is configured to determine direction of travel and speed of a mobile mesh radio node using data from an accelerometer placed on the mobile node to measure directional velocity.

12. The system of claim 1, comprising collision avoidance software which provides user interface instructions for avoiding collisions between objects.

13. The system of claim 1, comprising at least one motion detection component comprising an accelerometer to provide directional velocity information for at least one mobile unit.

14. The system of claim 1, wherein the computer vision component comprises:
a video imaging modality configured to provide an image capture of an asset;
wherein the computer processor is configured to receive asset tracking information and video image frames for analysis to identify assets according to a set of computer-executable instructions stored in the memory.

15. The system of claim 1, wherein the computer-executable instructions are configured to calculate the proximity of a human form by the size and heat intensity of the thermal or ultraviolet image capture whereby a brighter image pixel indicates warmer areas and closer and larger humans span a greater number of pixels than do farther and smaller humans.

16. The system of claim 1, wherein:
in addition to at least one of the motion detection components being placed on the first asset, at least one of the motion detection components is placed on the second asset; and
inputs from the asset tracking component and one or more of the motion detection components are combined into the collision avoidance algorithm to determine an intersection point and time to intersection point of the first asset and the second asset.

17. A method for avoiding asset collisions, the method comprising:

thermal imaging a first asset with a computer vision component and identifying the type of asset with the computer vision component, the computer vision component comprising:
- a video imaging component comprising one or more thermal infrared or ultraviolet cameras which provide video image frames comprising a thermal or ultraviolet image capture of an object;
- a computer processor; and
- a memory comprising a set of computer-executable instructions which instruct the computer processor to analyze video image frames received from the video imaging component to identify assets present in the thermal or ultraviolet image capture, wherein the set of computer-executable instructions employ object classification algorithms to identify the asset;

tracking the location of the first asset with an asset tracking component comprising fixed mesh radio nodes and mobile mesh radio nodes, wherein a mobile mesh radio node is placed on a first vehicle or a human and the asset tracking component determines the location of the mobile mesh radio node based on a Received Signal Strength Indication (RSSI) between the mobile mesh radio node and surrounding fixed mesh radio nodes;

tracking the speed and direction of travel of the first asset with a motion detection component which determines a directional velocity component for the asset tracking component based on an accelerometer-based motion sensor device placed on the first asset, wherein the directional velocity component comprises a speed and direction of travel;

determining a Threat Rating Value through a collision avoidance component which receives inputs from the computer vision component, asset tracking component, and motion detection component and combines the inputs into a collision avoidance algorithm programmed in a set of computer-executable instructions which instruct a processor to calculate the Threat Rating Value; and issuing a warning or instruction for action for the first asset to avoid collision with a second asset based on the Threat Rating Value;

wherein the Threat Rating Value is calculated as:

$$TRV = (K_{VH} \cdot A_{VH} \cdot V_{VH}) + (K_{VO} \cdot A_{VO} \cdot V_{VO}) + (K_{TS} \cdot \max[TRV_{TS1} \ldots TRV_{TSn}])$$

wherein:

$$TRV_{TS1} = C_{TS1} \cdot D_{TS1} \cdot V_{TS1}$$

$$TRV_{TSn} = C_{TSn} \cdot D_{TSn} \cdot V_{TSn}$$

$K_{VH}$=Weight constant for a host computer vision component input $A_{VH}$=Amplitude level for the host computer vision component input $V_{VH}$=Value of the host computer vision component input $K_{VO}$=Weight constant for an object computer vision component input $A_{VO}$=Amplitude level for the object computer vision component input $V_{VO}$=Value of the object computer vision component input $K_{TS}$=Weight constant for the asset tracking component input $V_{TS1}$=Value of a first asset tracking component input $TRV_{TS1}$=Threat rating value for an $n^{th}$ asset tracking component input $C_{TSn}$=Confidence level for the $n^{th}$ asset tracking component input $D_{TSn}$=Directional velocity component for the $n^{th}$ asset tracking component input $V_{TSn}$=Value of the $n^{th}$ asset tracking component input $TRV_{TSn}$=Threat rating value for the $n^{th}$ asset tracking component input TRV=Threat rating value for the Collision Avoidance Component.

18. The method of claim 17, wherein the first asset is a vehicle or human and the second asset is a vehicle or human.

19. The method of claim 17, wherein the collision avoidance component receives inputs comprising object recognition information from the computer vision component, position information from the asset tracking component, and directional velocity information from the motion detection component and combines the inputs into the collision avoidance algorithm.

* * * * *